United States Patent
Inane (10) Patent No.: US 11,073,627 B2
(45) Date of Patent: Jul. 27, 2021

(54) INVERSE GEOMETRY X-RAY MACHINE DEPLOYMENT IN WELLBORE

(71) Applicant: Baker Hughes Oilfield Operations LLC, Houston, TX (US)

(72) Inventor: Feyzi Inane, Houston, TX (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 111 days.

(21) Appl. No.: 16/517,089

(22) Filed: Jul. 19, 2019

(65) Prior Publication Data

US 2020/0041671 A1 Feb. 6, 2020

Related U.S. Application Data

(60) Provisional application No. 62/712,304, filed on Jul. 31, 2018.

(51) Int. Cl.
*G01V 5/12* (2006.01)
*G01T 1/40* (2006.01)

(52) U.S. Cl.
CPC ............... *G01T 1/40* (2013.01); *G01V 5/125* (2013.01)

(58) Field of Classification Search
CPC . G01T 1/40; G01V 5/125; G01V 5/12; G01V 5/145; E21B 47/00; E21B 47/0002; E21B 49/00; G01N 23/083
See application file for complete search history.

(56) References Cited

U.S. PATENT DOCUMENTS

| | | |
|---|---|---|
| 2009/0147907 A1 | 6/2009 | Wraight |
| 2013/0308753 A1* | 11/2013 | Groves .................. E21B 49/06 378/54 |
| 2014/0209298 A1 | 7/2014 | Baldasaro |
| 2015/0177409 A1 | 6/2015 | Sofiienko |
| 2016/0274038 A1 | 9/2016 | Brady |

OTHER PUBLICATIONS

International Search Report and Written Opinion dated Oct. 18, 2019 in corresponding PCT Application No. PCT/US19/42626.

* cited by examiner

*Primary Examiner* — Mark R Gaworecki
(74) *Attorney, Agent, or Firm* — Hogan Lovells US LLP (57) ABSTRACT

A system for obtaining downhole azimuthal imaging information includes a pressure housing. The system also includes a source arranged within the pressure housing, the source including a directable electron beam. The system further includes an anode positioned proximate the source, within the pressure housing, the anode having a tapered face adapted to interact with the directable electron beam and direct an x-ray beam away from the anode. The system also includes a detector arranged proximate the anode, the anode being between the source and the detector, wherein the detector receives scattered x-rays, from the x-ray beam, the received scattered x-rays corresponding to imaging information to determine one or more properties of a wellbore.

16 Claims, 5 Drawing Sheets

INVERSE GEOMETRY X-RAY MACHINE DEPLOYMENT IN WELLBORE

CROSS-REFERENCE TO RELATED APPLICATIONS

This application claims priority to U.S. Provisional Patent Application No. 62/712,304, filed Jul. 31, 2018 titled "INVERSE GEOMETRY X-RAY MACHINE DEPLOYMENT IN WELLBORE," the full disclosure of which is incorporated herein by reference it is entirety.

BACKGROUND

1. Field of Invention

This disclosure relates in general to oil and gas tools, and in particular, to systems and methods for inspecting downhole wellbore arrangements, such as open hole, cased, or plugged wells.

2. Description of the Prior Art

In oil and gas production, different pieces of equipment may be utilized in a downhole environment of a wellbore. For example, tubular sections known as casing may be installed in a borehole and then cemented in place. Additionally, various tools such as plugs and the like may be installed in the wellbore to perform different operations. Operators may want to inspect the cemented casings or the location of the plug, for example, for operational integrity. Various methods, such as nondestructive examination methods, may be used. However, various nondestructive examination tools may be too large for certain sections of wellbores. Additionally, the tools may be preferentially utilized with a variety of different downhole operational methods, such as logging while drilling or the like due to their size and detector arrangements.

SUMMARY

Applicant recognized the problems noted above herein and conceived and developed embodiments of systems and methods, according to the present disclosure, for determination of downhole formation properties.

In an embodiment, a system for obtaining downhole azimuthal imaging information includes a pressure housing. The system also includes a source arranged within the pressure housing, the source including a directable electron beam. The system further includes an anode positioned proximate the source, within the pressure housing, the anode having a tapered face adapted to interact with the directable electron beam and direct an x-ray beam away from the anode. The system also includes a detector arranged proximate the anode, the anode being between the source and the detector, wherein the detector receives scattered x-rays, from the x-ray beam, the received scattered x-rays corresponding to imaging information to determine one or more properties of a wellbore.

In an embodiment, a downhole imaging system includes an imaging tool forming at least a portion of a tool string, the tool string coupled to a wireline, the wireline suspending the tool string into a wellbore. The system also includes a pressure housing forming at least a portion of the imaging tool. The system further includes a source arranged within the pressure housing, the source emitting a directable electron beam. The system includes an anode having a tapered face adapted to interact with the directable electron beam, wherein interaction between the electron beam and anode produces an x-ray beam, the x-ray beam directed radially outward from the anode. The system also includes a detector arranged opposite the anode, the detector adapted to receive scattered x-rays, wherein the detector records the scattered x-rays during a time gate, the time gate being correlated with an azimuthal position of the wellbore.

In an embodiment, a method for obtaining image information includes directing an electron beam toward a first location of an anode. The method also includes correlating the first location with a first time gate. The method further includes obtaining image information during the first time gate. The method also includes directing the electron beam toward a second location of the anode. The method includes correlating the second location with a second time gate. The method further includes obtaining image information during the second time gate. The method also includes determining an azimuthal profile is complete. The method includes generating an azimuthal image.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure include an imaging system utilized in a downhole environment. In various embodiments, the imaging system may acquire image data or imaging information, which may correspond to density imaging, casing integrity imaging, cement integrity imaging, or the like. For example, the imaging information may correspond to data, acquired from one or more sensors, that may be utilized to obtain information about a wellbore, formation, or items that may be arranged within the wellbore. The imaging system may include an inverse geometry x-ray machine that arranges an anode between a source and a detector. The detector may receive backscatter x-rays from a formation that receives an x-ray beam directed into the formation from the anode. In various embodiments, the detector is a single detector. The detector may have a diameter that is substantially similar to a diameter of a housing of the imaging system, which may facilitate operation in small diameter wellbores. In various embodiments, the imaging system may be utilized to generate an azimuthal image of the wellbore, for example, by adjusting a location where the x-ray beam is emitted from the imaging system. For example, the source may include an electron beam that is directed toward a particular location of an anode. The x-rays from the anode may be directed into the formation and measurements obtained by the detector may be time gated to correspond to the particular location. The electron beam may be focused onto different areas of the anode to change a direction where the x-ray beam leaves the tool, thereby generating an azimuthal image of the wellbore.

Figure 1:
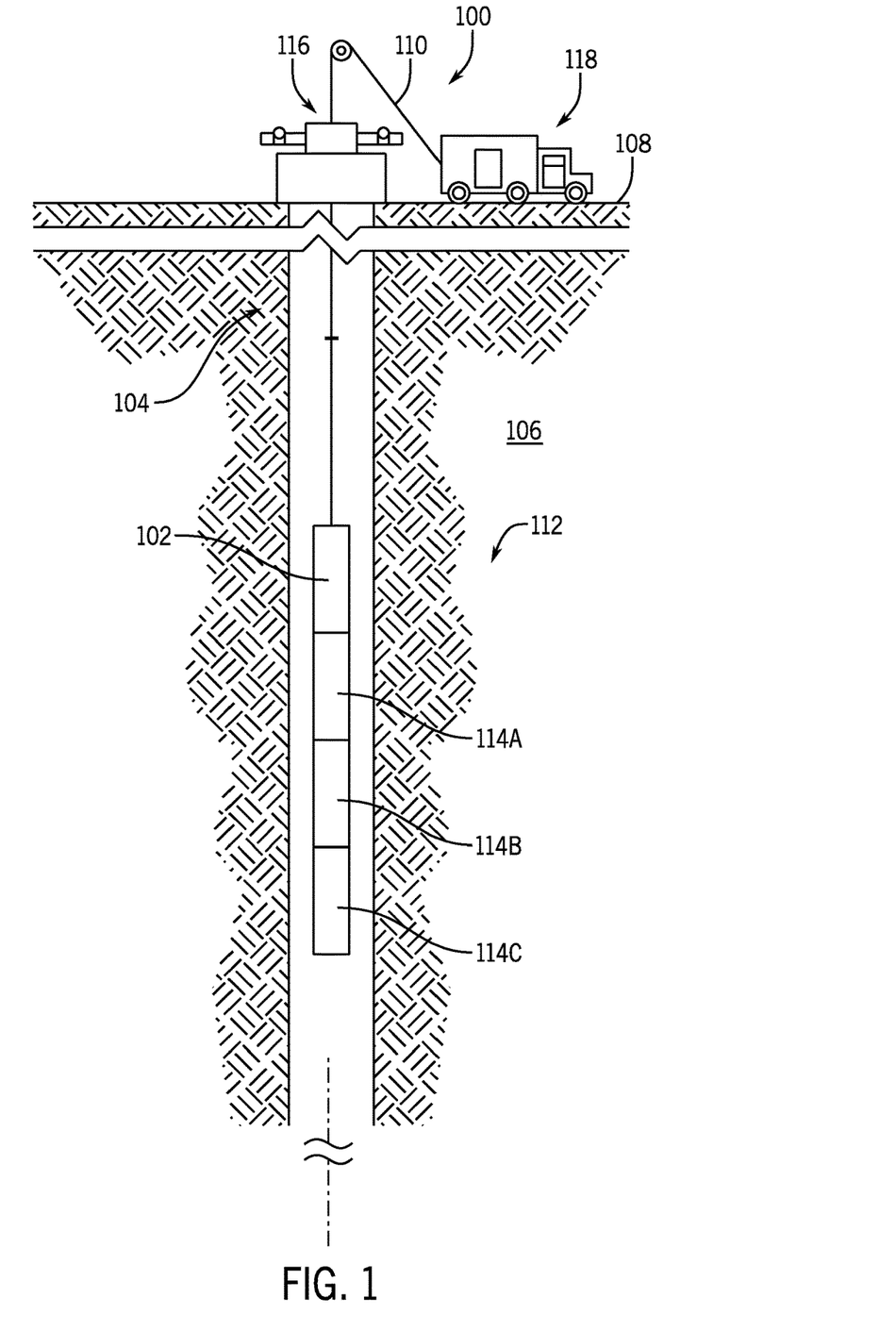
FIG. 1 is a schematic elevational view of an embodiment of a wellbore system, in accordance with embodiments of the present disclosure.

FIG. 1 is a schematic side view of an embodiment of a wellbore system 100 that includes a tool 102 (which may be part of a tool string) being lowered into a wellbore 104 formed in a formation 106 from a surface location 108. The illustrated wellbore 104 may be referred to as being open-bore, as no casing is illustrated along the wellbore walls. However, it should be appreciated that other wellbores, such as cased well bores, may also utilize embodiments of the present disclosure. In a cased wellbore, casing may be installed along the wellbore walls and cemented in place, thereby forming a barrier along the wellbore walls. As will be described below, in embodiments the casing may be perforated to facilitate recovery of fluids, such as hydrocarbons, from the wellbore. Furthermore, it should be appreciated that other components may also be arranged within the wellbore 104 and the embodiment of FIG. 1 is for illustrative purposes only. For example, the wellbore 104 may also include plugs or remediation equipment. The illustrated wellbore system 100 may be referred to as a wireline system because the tool 102 is conveyed on a cable 110, such as an electric wireline although this system could also be deployed on a drill string for measurement while drilling. In various embodiments, the electric wireline may transmit electric signals and/or energy from the surface location 108 into the wellbore, for example to provide operational power for the tool 102 and/or to transmit data, such as data obtained from sensors arranged on the tool 102. In various embodiments, the tool 102 may be utilized to perform downhole logging operations, and may be an imaging tool, a resistivity tool, a nuclear tool, or any other logging tool that may be used in a downhole environment. Moreover, in various embodiments, the tool 102 may include multiple logging or imaging tools therein. For simplicity, all logging or imaging tools described herein will be described with reference to the tool 102. However, in various embodiments the logs or images obtained from the various tools may be obtained at different times using different tools 102.

As described above, in various embodiments the tool 102 may be part of a tool string 112, which may include various components utilized for wellbore operations. For example, the tool string 112 may include various other tools 114A-114C that may include sensors, measurement devices, communication devices, and the like, which will not all be described for clarity. In various embodiments, the tool string 112 may include one or more tools to enable at least one of a logging operation, a perforating operation, or a well intervention. For example, nuclear logging tools, fluid sampling tools, core sampling devices, and the like may be utilized in logging operations. Perforating operations may include ballistic devices being lowered into the wellbore to perforate casing or the formation. Furthermore, well interventions may include operations related to analyzing one or more features of the wellbore and proceeding with performing one or more tasks in response to those features, such as a data acquisition process, a cutting process, a cleaning process, a plugging process, and inspection process, and the like. Accordingly, in various embodiments, the tool string 112 may refer to tools that are lowered into the wellbore. Additionally, passive devices such as centralizers or stabilizers, tractors to facilitate movement of the tool string 112 and the like may also be incorporated into the tool string 112.

In various embodiments, different power and/or data conducting tools may be utilized by embodiments of the present disclosure in order to send and receive signals and/or electrical power. As will be described below, in various embodiments sensors may be incorporated into various components of the tool string 112 and may communicate with the surface or other tool string components, for example via communication through the cable 110, mud pulse telemetry, wireless communications, wired drill pipe, and the like. Furthermore, it should be appreciated that while various embodiments include a wireline system, in other embodiments rigid drill pipe, coiled tubing, or any other downhole exploration and production methods may be utilized with embodiments of the present disclosure.

The wellbore system 100 includes a wellhead assembly 116 shown at an opening of the wellbore 104 to provide pressure control of the wellbore and allow for passage of equipment into the wellbore 104, such as the cable 110 and the tool string 112. In this example, the cable 110 is a wireline being spooled from a service truck 118. The illustrated cable 110 extends down to the end of the tool string 112. In operation, the cable 110 may be provided with slack as the tool string 112 is lowered into the wellbore 104, for example to a predetermined depth. In various embodiments, a fluid may be delivered into the wellbore 104 to drive movement of the tool string 112, for example where gravity may not be sufficient, such as in a deviated wellbore. For example, a fluid pumping system (not illustrated) at the surface may pump a fluid from a source into the wellbore 104 via a supply line or conduit. To control the rate of travel of the downhole assembly, tension on the wireline 110 is controlled at a winch on the surface, which may be part of the service tuck 118. Thus, the combination of the fluid flow rate and the tension on the wireline may contribute to the travel rate or rate of penetration of the tool string 112 into the wellbore 104. The cable 110 may be an armored cable that includes conductors for supplying electrical energy (power) to downhole devices and communication links for providing two-way communication between the downhole tool and surface devices. Moreover, in various embodiments, tools such as tractors and the like may further be disposed along the tool string 112 to facilitate movement of the tool string 112 into the wellbore 104. Thereafter, in various embodiments, the tool string 112 may be retrieved from the wellbore 14 by reeling the cable 110 upwards via the service truck 118. In this manner, logging operations may be performed as the tool string 112 is brought to the surface 108.

As will be described below, in various embodiments it may be challenging to inspect components of a well due to size constraints, among other factors. For example, production wells may have diameters that are too small to fit various tools or tool strings. As a result, inspection capabilities may be reduced. This is undesirable for many reasons, and by way of example, may be problematic for late stage wells, which may be nearing the end of their productive life. These wells are often decommissioned, which may include plugging and abandoning the wells. However, the wells are often inspected, for example, to determine a casing or cement condition to determine whether additional actions are advisable prior to decommissioning. Accordingly, it may be desirable to inspect a full azimuthal range of a well at various locations.

In various embodiments of the present disclosure, an inverse geometry x-ray scan system may be used in a downhole environment. One aspect of most of the measurement modalities used in downhole conditions is to form an azimuthal image. Although logging while drilling (LWD) tools may include self-shielding due to their structures and azimuthal imaging may be accomplished with the rotating tool, this is not the case with the wireline tools. Such azimuthal imaging is desired even in wireline applications or in applications where rotating tools are not practical or too expensive. This is especially true with the implementations where casing, and often cement between the casing, inspections are targeted by the implementations. Embodiments may use multiple detectors configured to form a ring inside the tool body so that an azimuthal image can be formed. Considering the tool diameter, such a concept usually ends up either in very large tools or in very small diameter detectors. While large diameter tools can't fit most of the completions, the small detector ones may have issues with the counting statistics. Inverse geometry x-ray machines can be implemented in relatively small diameter tools and can still provide good azimuthal imaging with good counting statistics using only one single detector with a diameter comparable to the tool internal diameter.

Figure 2A:
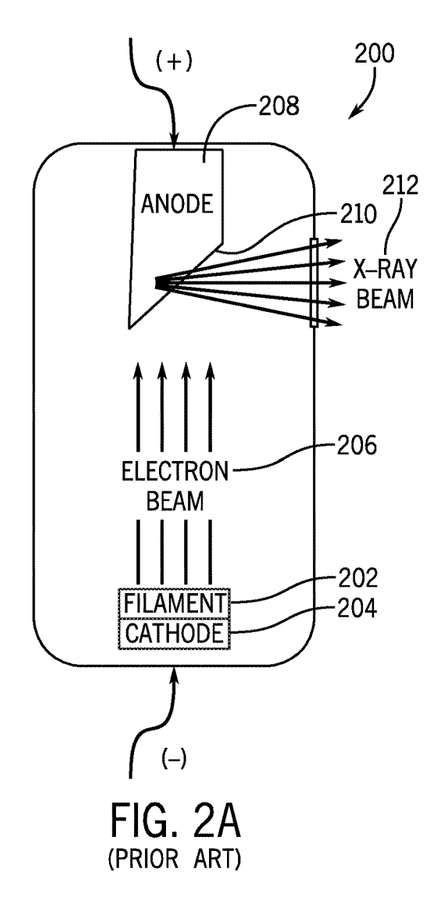
FIGS. 2A-2C are schematic diagrams of prior art x-ray systems.
Figure 2B:
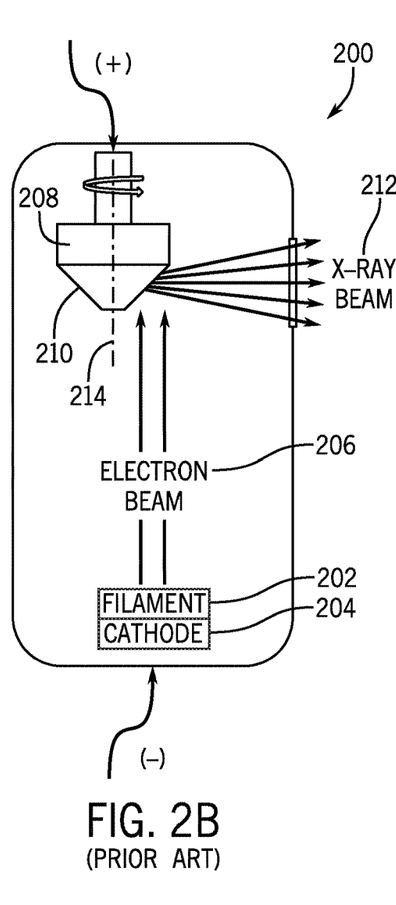

An x-ray machine emits an electron beam targeting an anode. Depending on the anode type, the x-ray beam made up of bremsstrahlung and characteristic x-rays can come through the side of the x-ray machine making an angle between 90°-180° with the direction of the electron beam incident on the anode. While some anodes are fixed, some others are rotating anodes. FIGS. 2A-2C are schematic embodiments of various x-ray systems 200 that may be utilized in a variety of industries to perform non-destructive examinations. The illustrated x-ray systems 200 of FIGS. 2A and 2B include a filament 202 and cathode 204 that generate an electron beam 206 directed toward an anode 208. The anode 208 includes a directing surface 210 that directs an x-ray beam 212 away from the anode 208. In the embodiment illustrated in FIG. 2A, the anode 208 is fixed. In the embodiment illustrated in FIG. 2B, the anode 208 may rotate about an anode axis 214. In each of the illustrated embodiments of FIGS. 2A and 2B, the x-ray beam 212 coming out of an x-ray window or opening within a housing has a substantially fixed cone beam that remains substantially constant during the exposure.

In certain implementations, such as medical or industrial applications, x-ray beams are directed to the object to be scanned. Usually, the imaging detector is a two dimensional (2D) detector. Traditionally, the detectors were x-ray films that would capture the image. In the current implementations, the detectors are 2D digitized detectors that can store or transmit pixels to the displays. In other words, the overall imaging setup is a fixed cone beam incident on the target and a 2D pixelized detector on the other side. In other words, the arrangement includes the detector arranged on an opposite side of the target than the source. Such an arrangement may not be practical in a downhole environment where it may be difficult to position the target between the source and the detector.

Figure 2C:
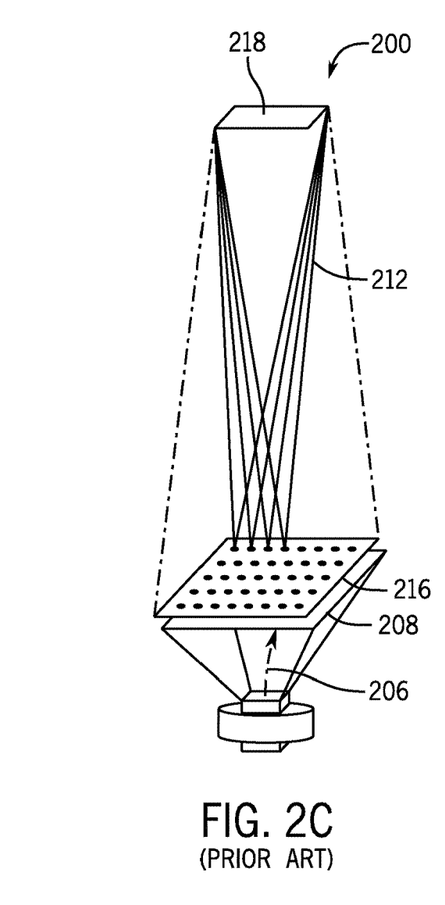

The illustrated x-ray system 200 of FIG. 2C is a scanning beam inverse x-ray system. The illustrated x-ray beam 212 is not fixed, but rather, is manipulated using deflection coils that enable the electron beam 206 to raster scan the anode 208. The illustrated embodiment includes directing the x-ray beam 212, from the anode 208, through a multihole collimator 216. A fixed detector 218 receives the x-ray beam 212, where the target may be arranged between the collimator 216 and the detector 218. Since the x-ray beam 212 scans the target, the x-ray beam 212 moves around with the movement of the electron beam 206. For such applications, there is no need for a pixelized detector. The detector 218 will detect whole incoming x-rays and signal will be correlated with the movement of the electron beam to form a 2D image although the detector is not an imaging detector.

Figure 3:
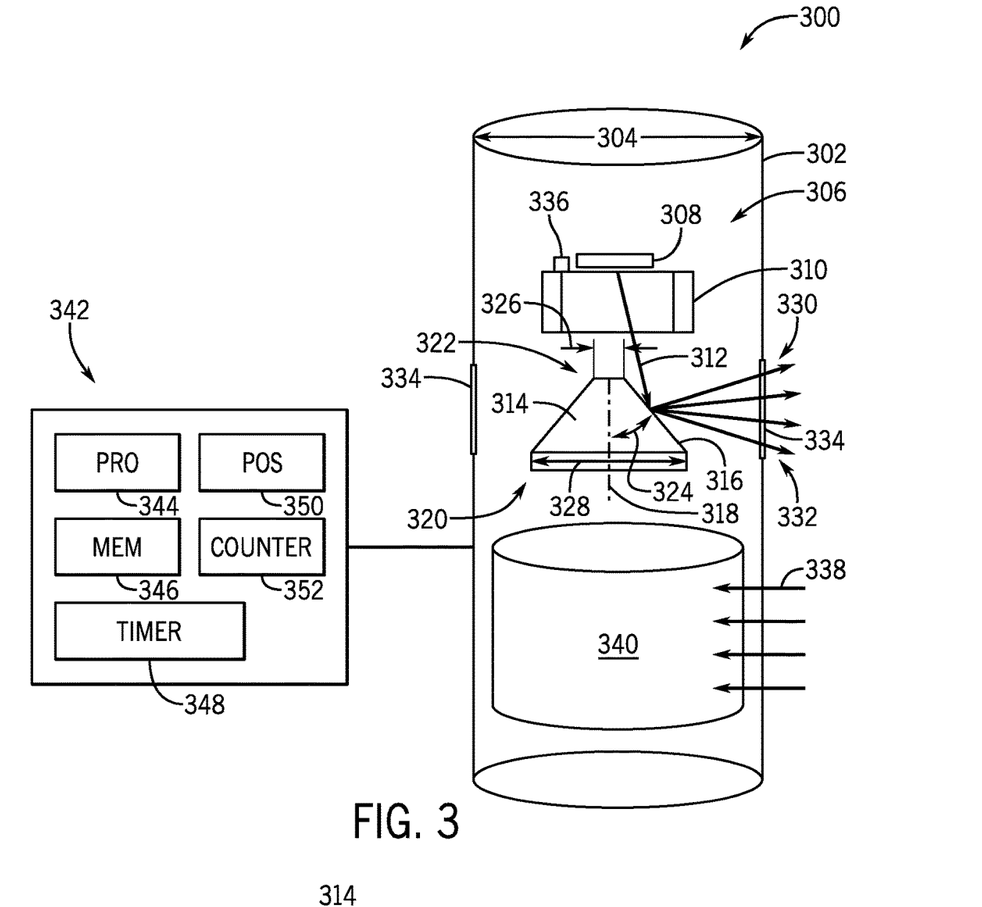
FIG. 3 is a schematic diagram of an embodiment of an imaging system, in accordance with embodiments of the present disclosure.

FIG. 3 is schematic diagram of an embodiment of an imaging system 300. The illustrated imaging system 300 may utilize an inverse geometry x-ray machine configuration and be utilized in a downhole environment, such as a wellbore. The illustrated imaging system 300 is arranged within a housing 302, such as a pressure housing of a downhole tool, and, in various embodiments, may have a diameter 304 that enables use in small-diameter wells. The pressure housing 302 may be sealed or substantially sealed to prevent the fluids from entering an internal cavity 306 of the housing 302.

The illustrated embodiment includes a filament 308 positioned proximate one or more beam bending coils 310, which may also be referred to as a deflection yoke. As used herein, proximate means close by or near and may also include embodiments where a portion of the filament 308 and one or more beam bending coils 310 at least partially overlap. Moreover, the proximate location of the filament 308 with respect to the beam bending boils 310 refers to an arrangement where an electron beam 312 emitted from, or a result of, or in connection with the filament 308 is directed toward the one or more beam bending coils 310. In embodiments, the combination of the filament 308 and the beam bending coils 310 may be referred to as a source. For example the electron beam 312 may be arranged such that the electron beam 312 is directed toward the beam bending coils 310 while minimizing or reducing a quantity that is directed elsewhere in the housing 302. The filament 308 may include power circuits emitting electrons that may be focused onto different portions of an anode 314 via the beam bending coils 310. In various embodiments, the one or more beam bending coils 310 include a set of coils arranged perpendicular to each other and to at least a portion of the filament 308. For example, the beam bending coils 310 may include magnetic or electric fields for substantially focusing the electron beam 312 toward a predetermined position of the anode 314. The coils 310 may provide a linear magnetic field distribution to direct the electronic beam 312 toward the anode 314. In embodiments, the anode 314 may be included as part of the source.

The illustrated anode 314 is conical in shape. That is, the anode 314 of the illustrated embodiment includes a tapered face 316 that extends inwardly toward an axis 318 from a bottom portion 320 to a top portion 322. The tapered face 316 is arranged at an angle 324 with respect to the axis 318. Furthermore, a diameter 326 of the top portion 322 is less than a diameter 328 of the bottom portion 320. As a result, the conical shape of the anode 314 may be described as extending outward toward the housing 302 with respect to movement from the top portion 322 to the bottom portion 320.

As the electron beam 312 is directed toward the anode 314, for example to a particular location of the anode 314 via the beam bending coils 310, an x-ray beam 330 is directed substantially horizontally in a cone shape 332 outward toward one or more windows 334 arranged about the housing 302. In an embodiment, the windows 334 may be substantially continuous circumferentially about the housing 302. In other embodiments, for example, the windows 334 may be arranged at particular locations about the housing 302. In various embodiments, the windows 334 are formed from materials that facilitate the pressure containing capabilities of the housing 302 while also reducing attenuation of the x-ray beam 330.

As described above, the beam bending coils 310 may direct and focus the electron beam toward different portions of the anode. In various embodiments, the electron beam 312 may be rotated about the anode 314, for example circumferentially about the axis 318 (which may be substantially parallel or co-axial with an axis of the housing 302). The electron beam 312 may be moved about the axis 318 in incremental movements or with continuous movements. In various embodiments, one or more sensors or electronics 336 may be utilized to track the focusing direction of the electron beam 312. As will be described below, determining where the electron beam 312 is focused may be correlated to the azimuthal position of the formation being evaluated relative to the housing 302. In other words, the emitted x-ray beam 330 may be directed circumferentially around the tool as the electron beam 312 is directed about the axis 318 and the corresponding location of the electron beam 312 may be correlated to returned scattered x-rays 338 detected by a detector 340. The detector 340 may acquire data that may be gated so that each data point is synchronized with a specific coordinate on the anode 314. With that, an azimuthal image may be built.

In various embodiments, the detector 340 may be a single detector, as illustrated in FIG. 3, or may be a plurality of detectors. The detector 340 may be any type of scintillation detector. In various embodiments, the detector 340 may be a dose measurement device, such as an ionizing chamber, such as a Geiger counter, or dosimeter. The amount of captured radiation may be correlated to scattering. For example, less material (e.g., damage to casing or cement) may be correlated to higher counts on the detector due to less scattering. Moreover, in various embodiments, the detector 340 may be a solid state detector, such as a semiconductor, which may convert x-ray photons to an electrical charge to obtain a digital image. In embodiments, the detector 340 may be an imaging detector, such as a digitizing device like an image plate or flat panel detector. It should be appreciated that a number of different varieties of detectors may be utilized in order to facilitate detection of the scattered x-rays 338.

As noted above, in various embodiments the detector 340 may be a single detector. A size of the detector 340 may be particularly selected based on the diameter 304 of the housing 302. For example, a larger housing 302 may receive a larger detector. A larger detector may facilitate improved capture statistics, as detector efficiency may be a function, at least in part, of detector size. Accordingly, a single large detector may provide improved counting statistics over smaller detectors because of an increased volume for interaction. However, in various embodiments, counting statistics may also be improved by counting for longer durations (e.g., providing more opportunity for interaction). Accordingly, in various embodiments, detector size and/or counting duration may be particularly selected and/or adjusted based on operational factors.

In various embodiments, the anode 314 is arranged between the filament 308 and the detector 340, which may provide shielding for the detector 340. For example, as the electron beam 312 is directed toward the anode 314, the anode 314 may block at least a portion of the electron beam 312 and/or the x-ray beam 330 from interacting with the detector 340. In various embodiments, the angle 324 of the tapered face 316 may at least partially facilitate shielding the detector 340 due to the deflection of the x-ray beam 330. In various embodiments, the anode 314 may be formed from tungsten, rhenium, molybdenum, some combination thereof, or any other reasonable material. As such, due to the shape and material of the anode 314, a substantially collimated beam may be generated that revolves around the tool.

In various embodiments, a control system 342 may be communicatively coupled to and/or a part of the imaging system 300. The control system 342 may include a processor 344 and memory 346. The memory 346 may store instructions executed by the processor 344, which may control or regulate one or more aspects of the imaging system. In the illustrated embodiment, the control system 342 includes a timer 348, which may be used in connection with time gating measurement cycles to correlate different measurements to different positions of the electron beam 312. The position of the electron beam 312 may further be determined by the one or more sensors 336, which may transmit information to the position controller 350. The position controller 350 may also adjust the position of the electron beam 312. Additionally, in embodiments, a counter 352 may be utilized to count interactions with the scattered x-rays 338, which may be referred to as image information. It should be appreciated that the control system 342, or any components thereof, may be arranged in the housing 302 and/or remote from the housing 302, such as uphole. Additionally, certain components may be arranged within the housing 302 while others are not.

Figure 4:
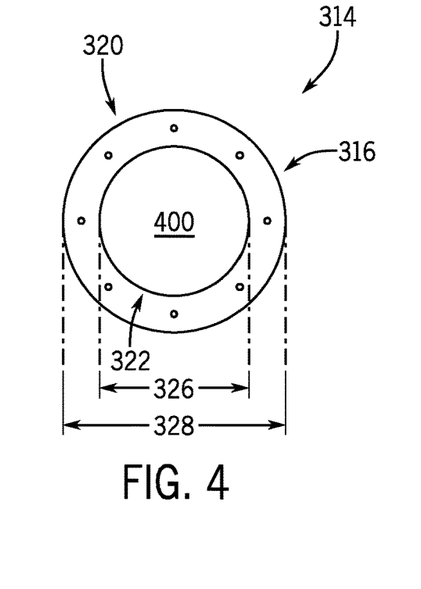
FIG. 4 is a top plan view of an embodiment of an anode, in accordance with embodiments of the present disclosure.

FIG. 4 is a top plan view of an embodiment of the anode 314. As noted above, the anode 314 is substantially conical and includes the tapered face 316 extending from the top portion 322 to the bottom portion 320. In the illustrated embodiment, the diameter 326 of the top portion 322 is less than the diameter 328 of the bottom portion 320, which facilitates an outwardly extending tapered face 316. In the illustrated embodiment, the top portion 322 may include a substantially flat surface 400. However, it should be appreciated that the top portion 322 may also extend to a point or to a sloped surface and that the substantially flat surface 400 is included for illustrative purposes only.

Figure 5:
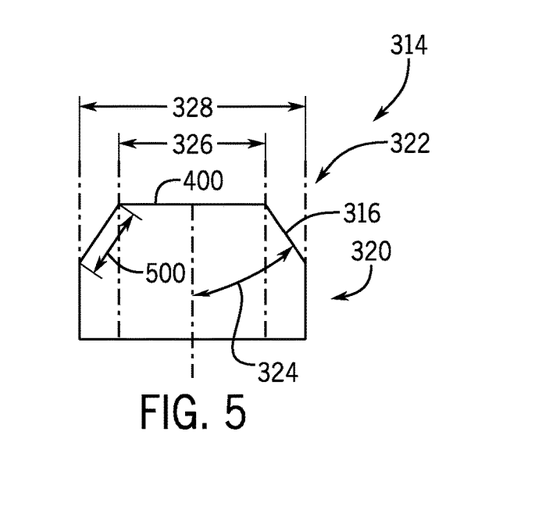
FIG. 5 is a side elevational view of an embodiment of an anode, in accordance with embodiments of the present disclosure.

FIG. 5 is a side elevational view of an embodiment of the anode 314. The illustrated embodiment includes the top portion 322, the bottom portion 320, and the tapered face 316. As illustrated, the tapered face 316 is arranged at the angle 324 and extends from the diameter 326 of the top portion 322 to the diameter 328 of the bottom portion 320. Furthermore, the substantially flat surface 400 is also illustrated in FIG. 5.

It should be appreciated that the angle 324 of the tapered face 316 may be particularly selected based on expected operational parameters of the system. For example, where the windows 334 are arranged on the housing 302 may influence the angle 324. Furthermore, in embodiments, the angle may not be constant along a length 500 of the tapered face 316. For example, a portion of the tapered face 316 may be at a first angle and a second portion may be at a second angle.

Figure 6:
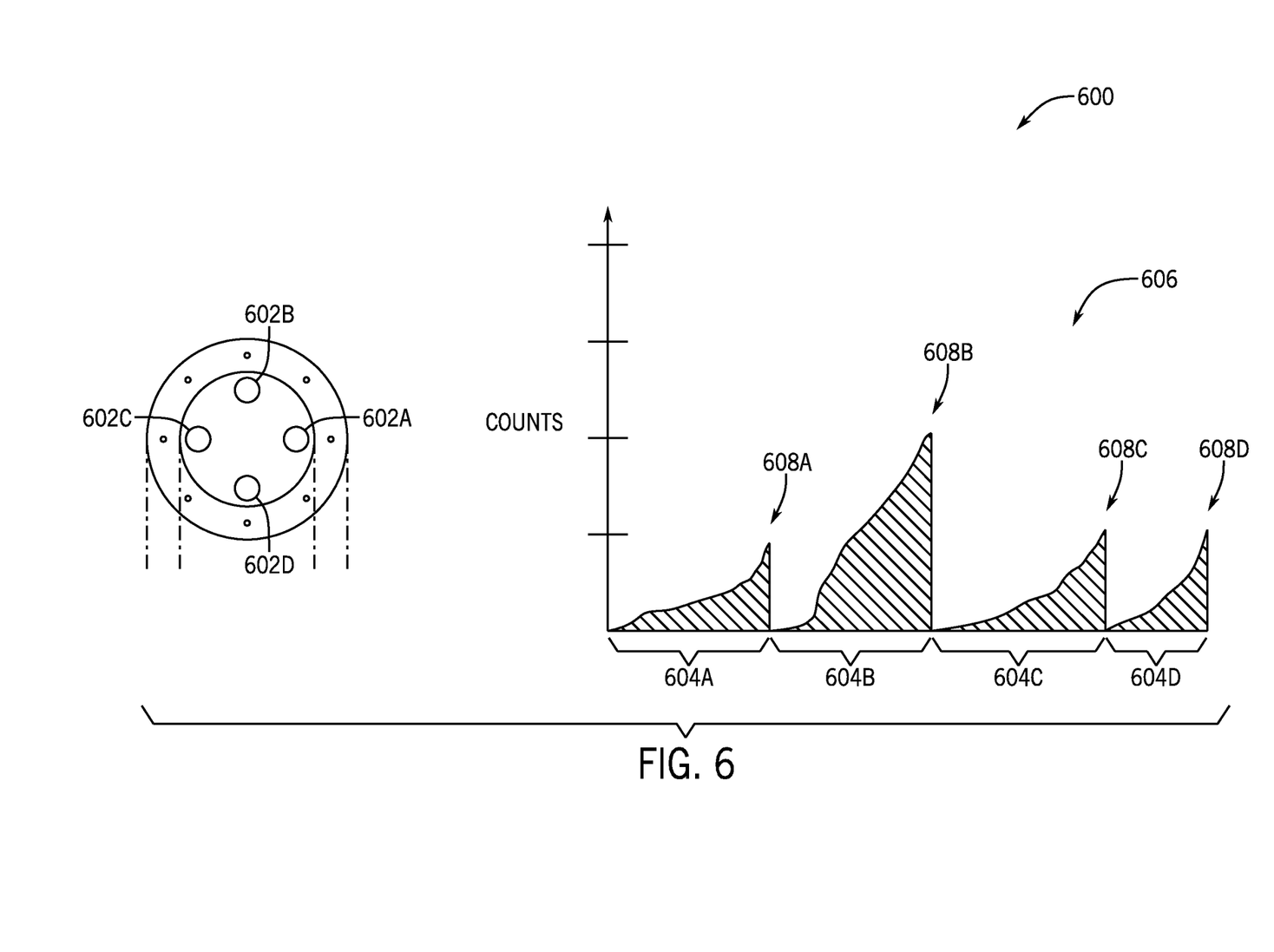
FIG. 6 is a schematic environment of an embodiment of an imaging process, in accordance with embodiments of the present disclosure.

FIG. 6 is an environment 600 illustrating a time gating operation of the imaging system 300 where a directed location 602 of the electron beam 312 may be associated with a time gate 604. It should be appreciated that the illustrated environment 600 is for example purposes only and is simplified for clarity with the following discussion. In operation, the beam bending coils 310 may direct the electron beam 312 to the directed location 602A, corresponding to a first azimuthal position of a wellbore. The electron beam 312 interacts with the anode 314 and produces the x-ray beam 330, which is directed into the formation. The x-ray beam 330 may interact with various components of the wellbore and/or formation, such as with the casing, cement, or the like. The scattered x-rays 338 are received by the detector 340, which may be utilized to determine one or more properties or features of the wellbore. In various embodiments, it may be desirable to associate an azimuthal wellbore position with the measurements obtained. The illustrated embodiment utilizes time gating that is associated with a position of the electron beam 312 on the anode 314. For example, in the illustrated embodiment, the electron beam 312 is directed to the directed location 602A during a time gate 604A. As a result, measurements obtained during the time gate 604A may be correlated to the directed location 602A, which may be combined with other measurements to form an azimuthal image, as described below.

A graphical representation 606 includes counts 608A-D obtained during the time gates 604A-D at the directed locations 602A-D. For example, in the illustrated embodiment, the counts 608A correspond to the directed location 604A during the time gate 604A, the counts 608B correspond to the directed location 602B during the time gate 604B, the counts 608C correspond to the directed location 602C during the time gate 604C, and the counts 608D correspond to the directed location 602D during the time gate 604D. As noted above, the use of four directed locations are for illustrative purposes only and there may be a different number of directed locations in other embodiments. Furthermore, the movement of the electron beam 312 may be varied to adjust a duration of the time gates 604. In the illustrated embodiment, the counts 608B are greater than the counts 608A, C, D. Accordingly, it may be inferred that there is less scattering at the azimuthal position associated with the directed location 602B, which may be indicative of less material, such as less casing or cement. Accordingly, by obtaining the different counts and correlating the counts with time gates that correspond to directed locations of the electron beam, an azimuthal picture of the wellbore is obtained.

Figure 7:
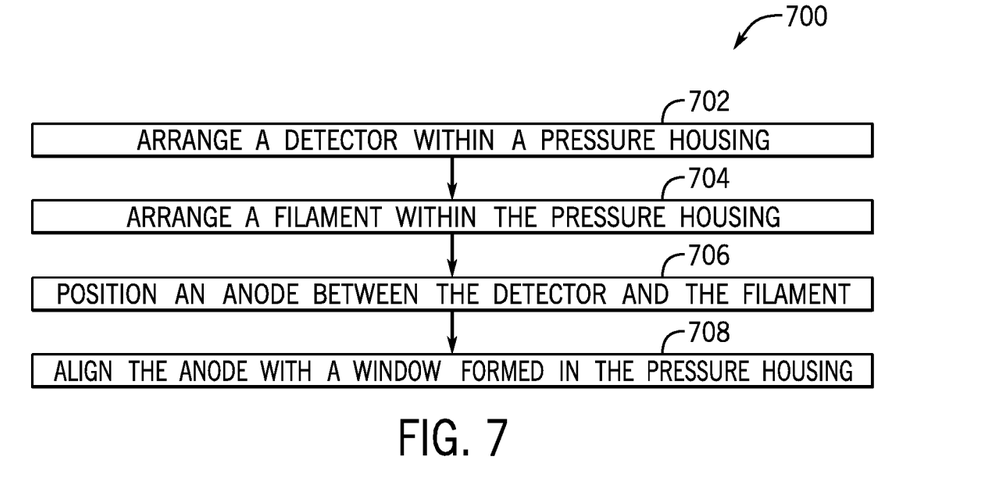
FIG. 7 is a flow chart of an embodiment of a method for forming an imaging system, in accordance with embodiments of the present disclosure.

FIG. 7 is a method 700 for forming an imaging system. It should be appreciated that the steps of the method may be performed in any order, or in parallel, unless otherwise specifically stated. Furthermore, in embodiments, there may be more or fewer steps. The method 700 of FIG. 7 begins with arranging a detector within a pressure housing 702. For example, a detector may be positioned within a housing that has a diameter that is substantially equal to a detector diameter. In embodiments, a filament, which may be utilized to generate a neutron beam, may be positioned within the pressure housing 704. The illustrated embodiment also includes positioning an anode between the filament and the detector 706. As described above, the anode may be utilized to direct an x-ray beam out of the housing and may also serve to shield the detector. The anode may be aligned with a window formed in the pressure housing 708. For example, the anode may include a tapered surface that is substantially aligned with the window to direct an x-ray beam out of the housing. In this manner, an imaging system, which may form part of a downhole tool, may be generated.

Figure 8:
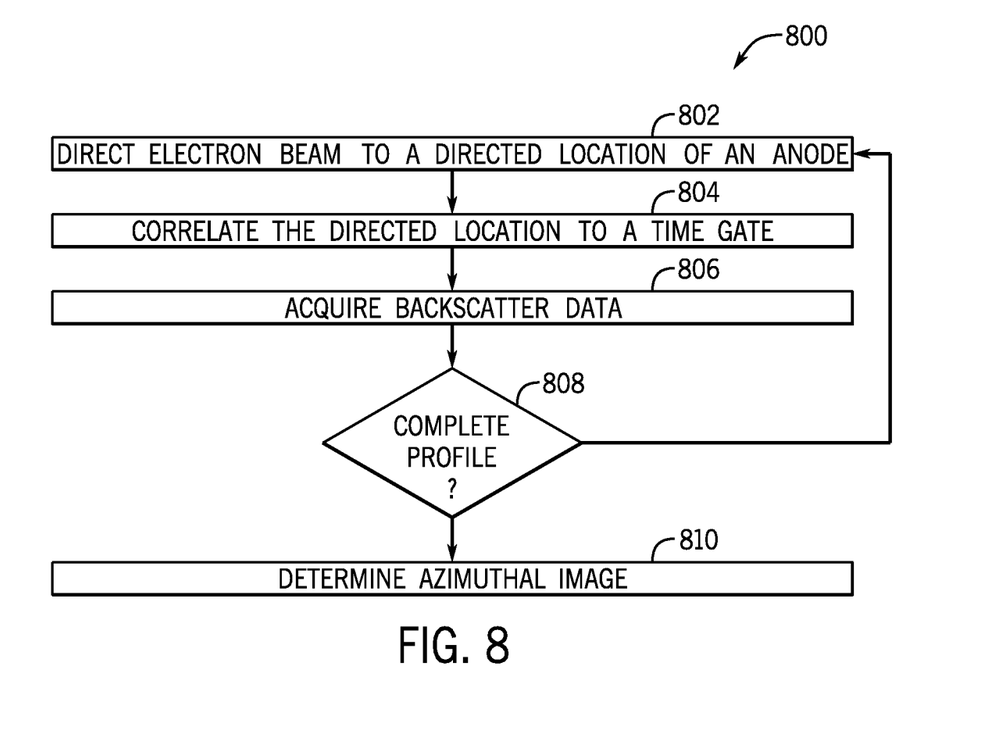
FIG. 8 is a flow chart of an embodiment of a method for determining an azimuthal wellbore image.

FIG. 8 is a method 800 for generating an azimuthal profile of a wellbore. The method 800 begins with directing an electron beam toward a directed location of an anode 802. The directed location may be predetermined and may be substantially aligned with a particular region of a wellbore. The directed location may be correlated to a time gate 804. For example, the electron beam and anode may produce an x-ray beam that interacts with the wellbore and/or formation, the interaction may produce scattered x-rays that are received by a detector. The time gate may correspond to the period of time when the electron beam is directed to the directed location. The backscatter or scattering data may be acquired by the detector 806. In various embodiments, it may be desirable to obtain an azimuthal profile of the wellbore. Accordingly, if there are additional portions of the wellbore for interrogation 808, the electron beam may be directed to a different location to obtain additional data. If the desired portions of the wellbore have been interrogated, then an azimuthal image may be produced 810. For example, the azimuthal image may determine areas of the wellbore with low scattering, which may be indicative of less material. As a result a variety of different wellbore properties may be evaluated.

It should be appreciated that although embodiments of the present disclosure have been described with reference to inspecting cement and casing, in the multi casing completions for plug and abandonment, the same concept can be adapted to form wireline azimuthal density images that are not possible with current technologies.

As described herein, an x-ray machine may be utilized in downhole operations to inspect various downhole properties, such as cements for casings, plugs, or to determine wireline azimuthal density images. The present embodiments provide the advantage of being able to fit within traditional wireline tools, as opposed to current techniques which may be too large for wireline operations. For example, other tools may utilize multiple detectors and arrangements that may not be feasible in wireline operations. Furthermore, embodiments of the present disclosure utilize one detector, although in other embodiments there may be more. By utilizing a single large detector, counting statistics may be improved. Additionally, in various embodiments, the electron beam may be programmed for direction to specific areas of the well. That is, the electron beam may be programmed to target a particular area of the anode that will transmit the collimated x-ray beam to the desired area. As such, particularized interrogation and inspection may be conducted. The targeted areas may be recorded, for example by a computer system having one or more memories and one or more processors, such that an azimuthal image may be developed.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for obtaining downhole azimuthal imaging information, comprising:
 a pressure housing;
 a source arranged within the pressure housing, the source including a directable electron beam;
 an anode positioned proximate the source, within the pressure housing, the anode having a tapered face adapted to interact with the directable electron beam and direct an x-ray beam away from the anode; and
 a detector arranged proximate the anode, the anode being between the source and the detector, wherein the detector receives scattered x-rays, from the x-ray beam, the received scattered x-rays corresponding to imaging information to determine one or more properties of a wellbore.

2. The system of claim 1, further comprising:
 a window formed in the pressure housing, the window being aligned with the anode, and the x-ray beam being directed toward the window.

3. The system of claim 2, wherein the window extends circumferentially about the pressure housing.

4. The system of claim 1, wherein the detector is a single detector and a diameter of the detector is substantially equal to a diameter of the pressure housing.

5. The system of claim 1, further comprising:
 a timer; and
 a position controller;
 wherein the position controller is communicatively coupled the source to control a directed location of the electron beam.

6. The system of claim 5, wherein the detector records the imaging information during a time gate measured by the timer, the time gate being correlated to the directed location of the electron beam during the time gate.

7. The system of claim 5, wherein the tapered face is arranged at an angle with respect to an axis of the anode, a top portion of the anode having a smaller diameter than a bottom portion of the anode.

8. The system of claim 1, wherein at least a portion of at least one of the electron beam or the x-ray beam is blocked from interacting with the detector via the anode.

9. The system of claim 1, wherein the source comprises:
 a filament; and
 a beam bending coil.

10. A downhole imaging system, comprising:
 an imaging tool forming at least a portion of a tool string, the tool string coupled to a wireline, the wireline suspending the tool string into a wellbore;
 a pressure housing forming at least a portion of the imaging tool;
 a source arranged within the pressure housing, the source emitting a directable electron beam;
 an anode having a tapered face adapted to interact with the directable electron beam, wherein interaction between the electron beam and anode produces an x-ray beam, the x-ray beam directed radially outward from the anode; and
 a detector arranged opposite the anode, the detector adapted to receive scattered x-rays, wherein the detector records the scattered x-rays during a time gate, the time gate being correlated with an azimuthal position of the wellbore.

11. The downhole imaging system of claim 10, further comprising:
 a window formed in the pressure housing, the window being aligned with the anode, and the x-ray beam being directed toward the window.

12. The downhole imaging system of claim 10, further comprising:
 a timer; and
 a position controller;
 wherein the position controller is communicatively coupled the source to control a directed location of the electron beam, the directed location being correlated to the timer.

13. The downhole imaging system of claim 10, wherein the tapered face is arranged at an angle with respect to an axis of the anode, a top portion of the anode having a smaller diameter than a bottom portion of the anode.

14. The downhole imaging system of claim 10, wherein at least a portion of the anode is adapted to shield the detector from at least one of the electron beam or the x-ray beam.

15. The downhole imaging system of claim 10, wherein the source is configured to direct the electron beam circumferentially about an axis of the anode to direct the x-ray beam circumferentially about the wellbore.

16. The downhole imaging system of claim 15, wherein the detector is configured to receive imaging information from a plurality of circumferential positions.

* * * * *

UNITED STATES PATENT AND TRADEMARK OFFICE
CERTIFICATE OF CORRECTION

PATENT NO. : 11,073,627 B2
APPLICATION NO. : 16/517089
DATED : July 27, 2021
INVENTOR(S) : Feyzi Inanc Page 1 of 1

It is certified that error appears in the above-identified patent and that said Letters Patent is hereby corrected as shown below:

On the Title Page

Item (12), correct from "United States Patent Inane" to -- United States Patent Inanc --

Item (72), correct from "Feyzi Inane" to -- Feyzi Inanc --

Signed and Sealed this
Twenty-sixth Day of July, 2022

Katherine Kelly Vidal
*Director of the United States Patent and Trademark Office*